United States Patent
Narita

(10) Patent No.: US 8,943,805 B2
(45) Date of Patent: Feb. 3, 2015

(54) METHOD FOR DETECTING ABNORMALITY IN REDUCING AGENT

(75) Inventor: Hironori Narita, Hino (JP)

(73) Assignee: Hino Motors, Ltd., Hino-shi (JP)

( * ) Notice: Subject to any disclaimer, the term of this patent is extended or adjusted under 35 U.S.C. 154(b) by 58 days.

(21) Appl. No.: 13/255,177

(22) PCT Filed: Feb. 24, 2010

(86) PCT No.: PCT/JP2010/001232
§ 371 (c)(1),
(2), (4) Date: Sep. 7, 2011

(87) PCT Pub. No.: WO2010/125726
PCT Pub. Date: Nov. 4, 2010

(65) Prior Publication Data
US 2012/0000185 A1 Jan. 5, 2012

(30) Foreign Application Priority Data
Apr. 30, 2009 (JP) ................. 2009-110844

(51) Int. Cl.
*F01N 3/00* (2006.01)
*F01N 11/00* (2006.01)
*F01N 3/20* (2006.01)

(52) U.S. Cl.
CPC .............. *F01N 11/00* (2013.01); *F01N 3/2066* (2013.01); *F01N 3/208* (2013.01);
(Continued)

(58) Field of Classification Search
CPC ............ F01N 11/00; F01N 3/20; F01N 3/18; F01N 3/08; F01N 3/2066; F01N 3/208; F01N 2610/142; F01N 2610/02; G01M 15/10

USPC ............... 60/286, 277, 301, 295, 274
See application file for complete search history.

(56) References Cited

U.S. PATENT DOCUMENTS 7,526,950 B2 *  5/2009  Van Nieuwstadt et al. ................ 73/114.75
8,171,723 B2 *  5/2012  Hagimoto et al. ............ 60/286
(Continued)

FOREIGN PATENT DOCUMENTS

| JP | 2006 037770 | 2/2006 |
| JP | 2008 190529 | 8/2008 |
| JP | 2009 138626 | 6/2009 |

OTHER PUBLICATIONS

U.S. Appl. No. 13/254,926, filed Sep. 6, 2011, Narita.
(Continued)

*Primary Examiner* — Thomas Denion
*Assistant Examiner* — Kelsey Stanek
(74) *Attorney, Agent, or Firm* — Oblon, Spivak, McClelland, Maier & Neustadt, L.L.P.

(57) ABSTRACT

Disclosed is a method for detecting abnormality in a reducing agent 17 replenished to a reducing agent tank 14 in an exhaust emission control device for reduction and removal of $NO_x$ through addition of the reducing agent 17 from the tank 14 to a selective reduction catalyst 10 incorporated in an exhaust pipe 9. Presence or absence of $NH_3$ slip is determined when a lowering of $NO_x$ removal rate is detected. When the presence of the $NH_3$ slip is detected, it is determined that the selective reduction catalyst 10 is deteriorated; when the absence of the $NH_3$ slip is determined, it is determined that a dilute reducing agent or/and a material other than the reducing agent are replenished into the tank.

2 Claims, 5 Drawing Sheets

(52) U.S. Cl.
CPC ...... *F01N 2550/05* (2013.01); *F01N 2560/026* (2013.01); *F01N 2610/02* (2013.01); *F01N 2900/1402* (2013.01); *F01N 2900/1616* (2013.01); *F01N 2900/1806* (2013.01); *Y02T 10/47* (2013.01); *Y02T 10/24* (2013.01); *F01N 2550/02* (2013.01); *F01N 2560/021* (2013.01); *F01N 2900/1818* (2013.01); *F01N 2610/142* (2013.01)
USPC .................................. 60/286; 60/274; 60/301

(56) References Cited

U.S. PATENT DOCUMENTS

2008/0178656 A1     7/2008   Nieuwstadt et al.
2009/0272099 A1*   11/2009   Garimella et al. .............. 60/277

OTHER PUBLICATIONS

International Search Report issued May 25, 2010 in PCT/JP10/001232 filed Feb. 24, 2010.

* cited by examiner

ALLOWABLE ADSORBED AMOUNT OF $NH_3$

METHOD FOR DETECTING ABNORMALITY IN REDUCING AGENT

TECHNICAL FIELD

The present invention relates to a method for detecting abnormality in a reducing agent used for an exhaust emission control device.

BACKGROUND ART

Conventionally, some diesel engines have a selective reduction catalyst incorporated in an exhaust pipe through which exhaust gas flow, said catalyst having a property of selectively reacting $NO_x$ with a reducing agent even in the presence of oxygen. From a reducing agent tank, a required amount of reducing agent is added upstream of the selective reduction catalyst and is reacted on the catalyst with $NO_x$ (nitrogen oxides) in the exhaust gas to thereby decrease a concentration of $NO_x$ discharged.

Effectiveness of ammonia ($NH_3$) used as a reducing agent for reduction and removal of $NO_x$ is well known in a field of industrial flue gas denitration in a plant or the like. However, in a field of an automobile where safety is hard to assure as to running with ammonia itself being loaded, recently used as the reducing agent is nontoxic urea water.

For example, Patent Literature 1 is already present as prior document related to the invention.

CITATION LIST

Patent Literature

[Patent Literature 1] JP 2006-37770A

SUMMARY OF INVENTION

Technical Problems

Such exhaust emission control device has, however, a problem that mistaken replenishment of a dilute reducing agent or a different material such as water into the reducing agent tank, which will lower a $NO_x$ removal rate, cannot be easily notified of to a driver or the like.

More specifically, the $NO_x$ removal rate may be lowered by deterioration of the selective reduction catalyst. Thus, there exits a problem that undistinguishable are a case where a dilute reducing agent or/and a different material such as water are mistakenly replenished from a case where the selective reduction catalyst is deteriorated.

Moreover, when a reducing agent is replenished little by little into the tank, mistaken replenishment of a dilute reducing agent or/and a different material such as water may cause the reducing agent in the tank to be gradually diluted so that a problem arises that this situation cannot be easily detected.

The invention was conceived in view of the above and has its object to provide a method for detecting abnormality in a reducing agent which easily and suitably detects mistaken replenishment of a dilute reducing agent or/and a material other than the reducing agent into a reducing agent tank.

Solution to Problems

The invention provides a method for detecting abnormality in a reducing agent replenished to a reducing agent tank in an exhaust emission control device for reduction and removal of $NO_x$ through addition of the reducing agent from said tank to a selective reduction catalyst incorporated in an exhaust pipe, which comprises determining presence or absence of $NH_3$ slip when a lowering of $NO_x$ removal rate is detected; determining the deteriorated selective reduction catalyst when the presence of the $NH_3$ slip is determined; and determining that a dilute reducing agent or/and a material other than the reducing agent are replenished into the tank when the absence of the $NH_3$ slip is determined.

In the invention, it is preferable that the $NH_3$ slip is recorded in a driving history and, when the lowering of the $NO_x$ removal rate is detected, the presence or absence of the $NH_3$ slip in the driving history is determined.

In the invention, it is preferable that, when the $NO_x$ removal rate is lowered, a temperature of the selective reduction catalyst is elevated and thereafter the presence or absence of the $NH_3$ slip is determined.

In the invention, it is preferable that a second detection of the lowering of the $NO_x$ removal rate is further conducted after the presence or absence of the $NH_3$ slip is determined.

Advantageous Effects of Invention

According to the method for detecting abnormality in a reducing agent of the invention, mistaken replenishment of a dilute urea water or/and a material such as water other than the urea water into a urea water tank cause a lowering of the $NO_x$ removal rate and do not cause $NH_3$ slip to the same degree as that of the deteriorated catalyst, so that it is determined that the dilute reducing agent or/and the material other than the reducing agent is mistakenly replenished into the tank and the mistaken replenishment can be notified of to a driver or the like; the deteriorated selective reduction catalyst causes the lowering of the $NO_x$ removal rate and generation of the $NH_3$ slip, so that it is determined that the selective reduction catalyst is deteriorated and the deterioration can be notified of to the driver or the like. Thus, the case where the dilute reducing agent or/and the material other than the reducing agent are mistakenly replenished is clearly distinguished from the case where the selective reduction catalyst is deteriorated, so that the case of the mistaken replenishment into the tank can be easily and properly detected. Even when the dilute reducing agent or/and the material other than the reducing agent are mistakenly replenished gradually into the tank such that the reducing agent in the tank is gradually diluted, the lowering of the $NO_x$ removal rate and generation of the $NH_3$ slip are used as the determination criteria so that mistaken replenishment of the dilute reducing agent or/and the material other than the reducing agent into the tank can be easily detected. As above, various excellent effects can be obtained.

DESCRIPTION OF EMBODIMENTS

A first embodiment of the invention will be described with reference to drawings.

Figure 1:
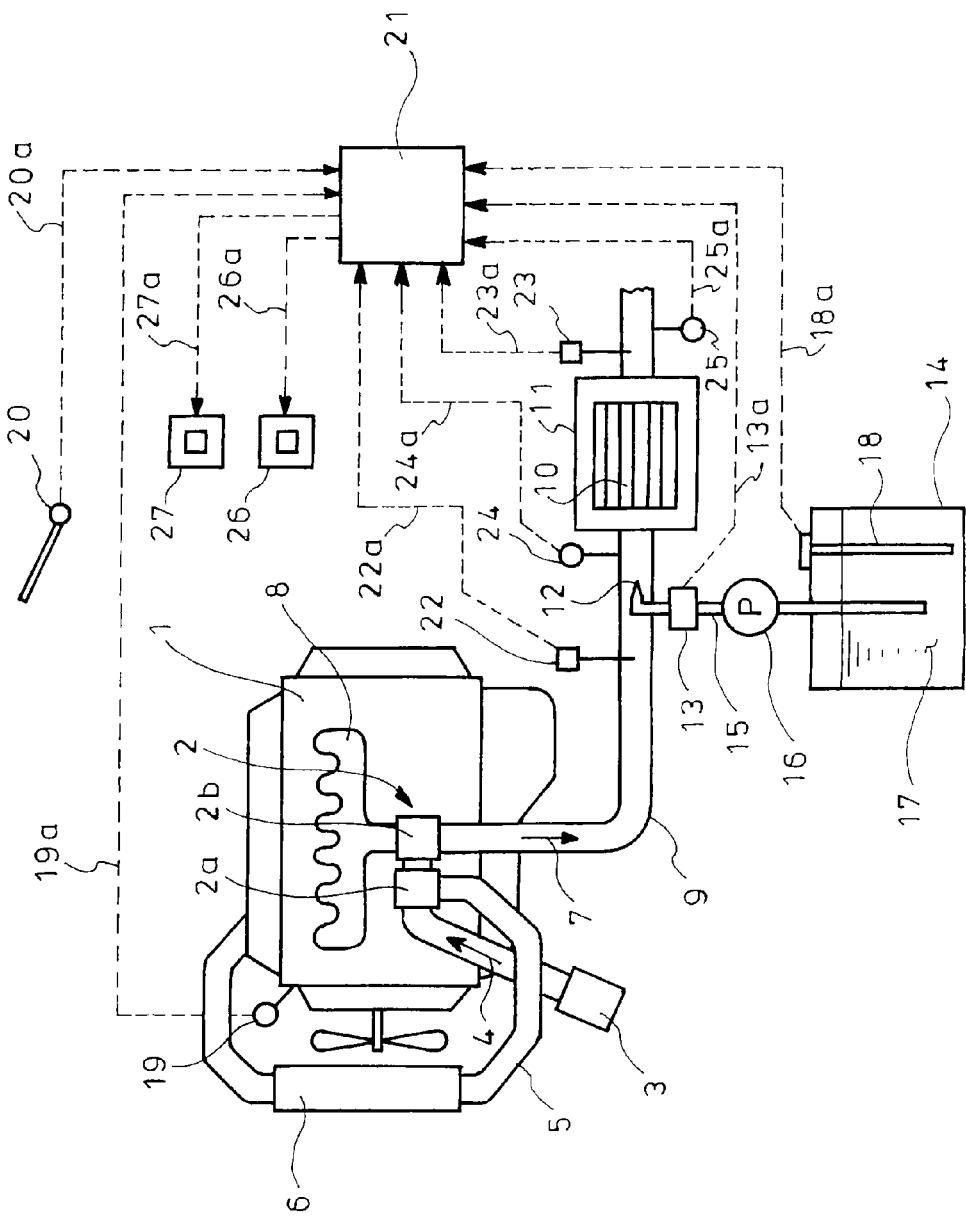
FIG. 1 is a schematic diagram showing embodiments of the invention.
Figure 2:
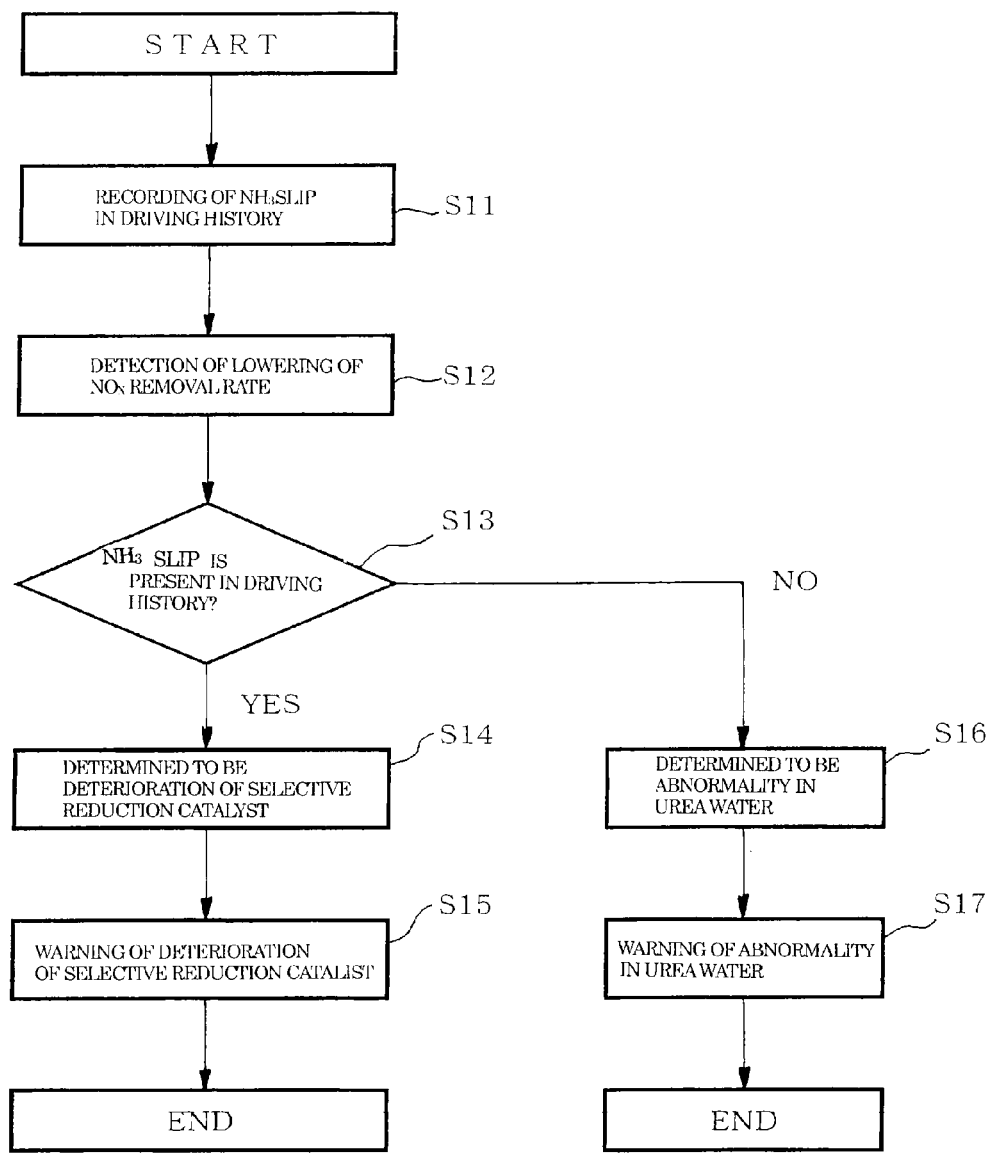
FIG. 2 is a flowchart of processes in a first embodiment of the invention.

FIGS. 1, 2, 4 and 5 are directed to the first embodiment of the invention and show an exhaust emission control device and a method for detecting abnormality in a reducing agent. In FIG. 1, a reference numeral 1 denotes an engine which is a diesel engine. The engine 1 shown is provided with a turbocharger 2 having a compressor 2a to which air 4 from an air cleaner 3 is guided through an intake pipe 5. The air 4 compressed by the compressor 2a is further guided to an intercooler 6 where the air 4 is cooled and guided to an intake manifold (not shown) so as to be introduced into each of cylinders of the engine 1.

An exhaust gas 7 discharged from each of the cylinders of the engine 1 is guided through an exhaust manifold 8 to a turbine 2b of the turbocharger 2. After driving the turbine 2b, the exhaust gas 7 is discharged outside of an automobile through an exhaust pipe 9.

A selective reduction catalyst 10 carried by a casing 11 is incorporated in the exhaust pipe 9 through which the exhaust gas 7 flows, is formed as a flow-through type honeycomb structure and has a property capable of selectively reacting $NO_x$ with ammonia ($NH_3$) even in the presence of oxygen.

Further, a urea water injection valve 13 with an injection nozzle 12 is arranged upstream of the casing 11 and is connected through a urea water supply line 15 to a urea water tank (reducing agent tank) 14 provided at any required site, so that urea water (reducing agent) 17 in the tank 14 can be added upstream of the selective reduction catalyst 10 through the injection valve 13 by driving a supply pump 16 incorporated in the supply line 15. The tank 14 is provided with a liquid level detecting means 18 such as a liquid level sensor which detects a liquid level of the urea water 17 inside. The detecting means 18 may employ a float, ultrasound or the like or may be of any other configuration, provided that the liquid level of the urea water 17 inside can be detected. The urea water tank 14 is not limited to the configuration including the injection nozzle 12, the injection valve 13, the supply line 15 and the supply pump 16 and may be of any other configuration, provided that the urea water 17 can be added upstream of the selective reduction catalyst 10.

The engine 1 is provided with a rotation sensor 19 which detects a rotation number of the engine. A rotation number signal 19a from the sensor 19 and a load signal 20a from an accelerator sensor 20 (a sensor detecting a stepping-on angle of an accelerator pedal) are input to a controller 21 as an engine control computer (ECU: Electronic Control Unit).

An amount of $NO_x$ generated is estimated in the controller 21 on the basis of a current driving state determined from the rotation number and load signals 19a and 20a from the sensors 19 and 20, respectively. An amount of urea water 17 to be added is calculated in conformity with the estimated amount of $NO_x$ generated; and addition of the required amount of urea water 17 is executed. More specifically, a valve opening command signal 13a is output to the injection valve 13 and a driving command signal (not shown) is output to the supply pump 16, so that the amount of urea water 17 to be added is properly controlled by an valve opening action of the injection valve 13, and an injection pressure necessary for the addition can be suitably acquired by the driving of the supply pump 16. Further, the controller 21 estimates the amount of urea water 17 in the tank 14 on the basis of a liquid level signal 18a from the liquid level detecting means 18 so as to determine the remaining amount of urea water 17 and a timing to replenish the urea water 17.

$NO_x$ sensors 22 and 23 for detection of $NO_x$ concentrations and temperature sensors 24 and 25 for detection of exhaust temperatures are disposed at an entrance and an exit of the casing 11 carrying the selective reduction catalyst 10, respectively, to input detection signals 22a and 23a and 24a and 25a to the controller 21 so as to detect a $NO_x$ removal rate on the basis of the detection signals 22a and 23a and 24a and 25a; and simultaneously, a concentration of $NH_3$ is detected on the basis of the detection signals 22a and 23a. The $NO_x$ removal rate may be detected on the basis of any of the detection signals 22a and 23a and 24a and 25a or any other signal or signals may be used; means and a method for detection are not especially limited, provided that the actual $NO_x$ removal rate can be detected. The concentration of $NH_3$ may be alternatively detected using the detection signals 24a and 25a other than the detection signals 22a and 23a or any other signal or signals may be used; means and a method for detection are not especially limited, provided that the concentration of $NH_3$ can be detected.

The controller 21 is connected to display means 26 such as a display monitor or lamp which indicates abnormality under a predetermined condition on the basis of a display signal 26a, and is connected to display means 27 such as a display monitor or lamp which indicates abnormality under another condition on the basis of a display signal 27a. The controller 21 preliminarily has a built-in function to execute processes based on the flow of FIG. 2.

An operation of the first embodiment of the invention will be described.

In order to lower the concentration of $NO_x$ discharged in the exhaust gas 7 by the exhaust emission control device, from the urea water tank 14, the urea water 17 is added upstream of the selective reduction catalyst 10 to bring about a reducing reaction of the urea water 17 with NO in the exhaust gas on the catalyst 10 to thereby decrease the concentration of $NO_x$ discharged. Thereafter, the decrease of the urea water 17 in the tank 14 due to the addition of the urea water 17 from the tank is properly compensated by replenishment of the urea water 17 into the tank 14.

Figure 4:
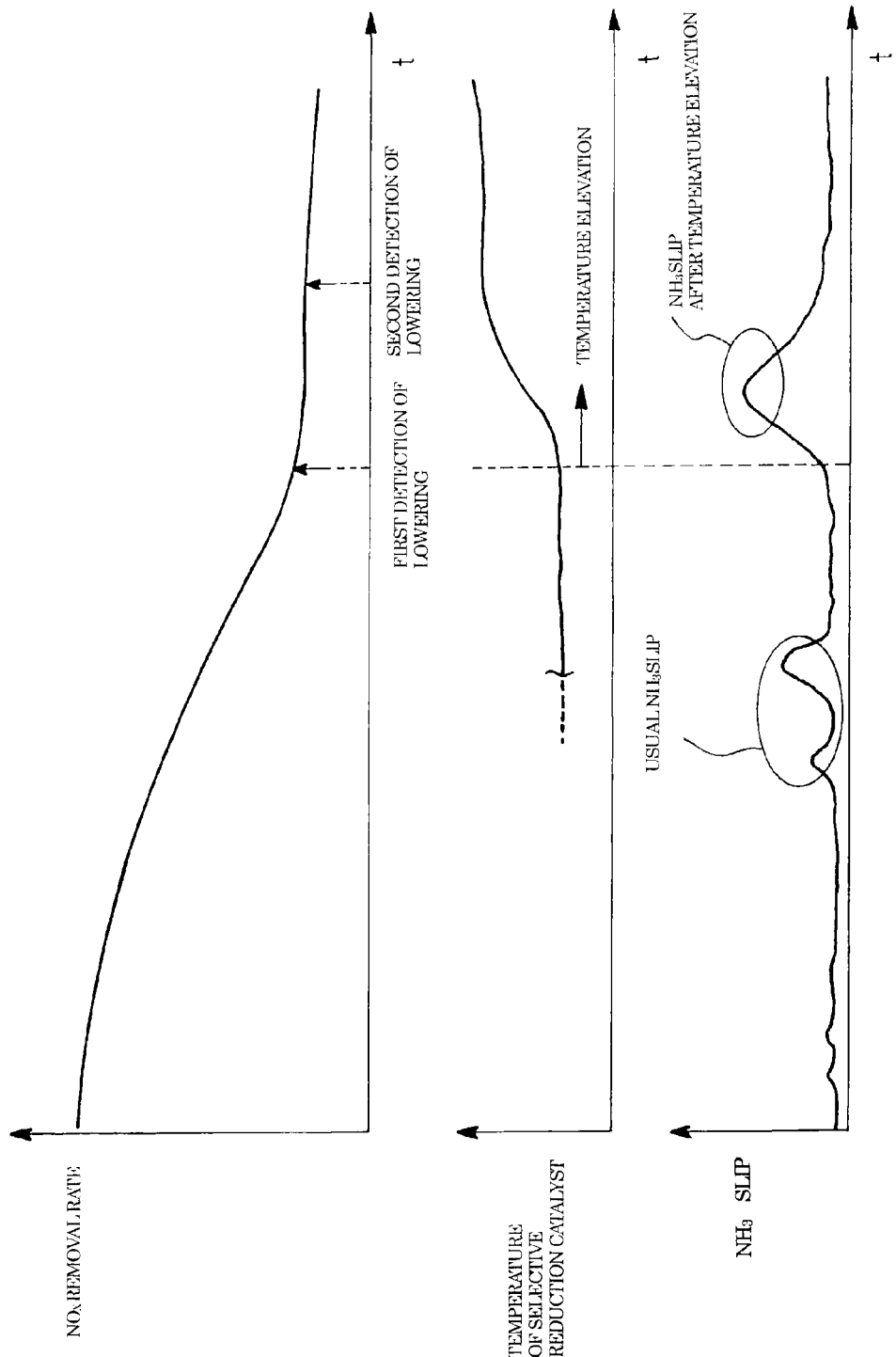
FIG. 4 is a diagram of graphs of variation of $NO_x$ removal rate, a temperature of a selective reduction catalyst and $NH_3$ slip.

In order to distinguish a case of mistaken replenishment of the dilute urea water 17 or/and water (a material other than the urea water) into the tank 14 from a case of the deteriorated selective reduction catalyst 10, presence or absence of $NH_3$ slip is preliminarily recorded in a driving history in a control unit on the basis of, e.g., the detection signals 22a and 23a (step S11). In the step, the presence or absence of the $NH_3$ slip is determined depending on whether the concentration of $NH_3$ was at or above a specific value (threshold value) or not. When the concentration was at or above the specific value, it is determined and recorded that there was $NH_3$ slip from the selective reduction catalyst 10 to downstream. When the concentration was and is below the specific value (threshold value), it is determined that there was and is no $NH_3$ slip from the catalyst 10 to downstream. In the driving history, the monitoring is executed in a state of at least $NO_x$ being not discharged under a condition that no fuel is supplied to the engine and no urea water is added as in the case where the automobile maintains its running at a lower speed over a predetermined time period or where the automobile is decreasing its speed. In FIG. 4, the detection of the $NH_3$ slip in the driving history is shown as an usual $NH_3$ slip.

Simultaneously, a lowering of the $NO_x$ removal rate is detected on the basis of the detection signals 22a and 23a and 24a and 25a (step S12). As to detection of the lowering of the $NO_x$ removal rate in this step, comparison is made with a reference $NO_x$ removal rate (threshold value) recorded in advance. When the $NO_x$ removal rate is lower than the reference $NO_x$ removal rate, it is determined that the lowering of the $NO_x$ removal rate is present and, when the $NO_x$ removal rate is not lower than the reference $NO_x$ removal rate, it is determined that no lowering of the $NO_x$ purification rate is present. In FIG. 4, the lowering of the $NO_x$ removal rate is shown as first detection of the lowering.

After detection of the lowering of the $NO_x$ removal rate (step S12), presence or absence of the $NH_3$ slip is determined on the basis of the driving history (step S13). Here, the $NH_3$ slip may be that generated after the lowering of the $NO_x$ removal rate; in this case, a predetermined time period after the lowering of the $NO_x$ removal rate may be set for determination of the $NH_3$ slip.

When the $NH_3$ slip is present in the driving history (YES in step S13), it is determined to be deterioration of the selective reduction catalyst 10 (step S14). After determination of the deterioration of the catalyst 10, the controller 21 transmits the display signal 27a to the display means 27 where a warning of the deterioration of the selective reduction catalyst 10 is generated and notified of to the driver or the like (step S15).

On the other hand, when no $NH_3$ slip is present in the driving history (NO of step S13), it is determined to be abnormality in the urea water (reducing agent) and that the dilute urea water 17 or/and a material such as water other than the urea water are mistakenly replenished into the tank 14 (step S16). In the step, the dilute urea water 17 is not limited to that with a specific concentration, provided that the concentration of the usual urea water 17 in the tank 14 can be lowered; the kind of material other than the urea water is not especially limited, provided that the concentration of the urea water 17 in the tank 14 can be lowered.

After determining that the dilute urea water 17 or/and the material such as water other than the urea water are mistakenly replenished, the controller 21 transmits the display signal 26a to the display means 26 where a warning of the mistaken replenishment of the dilute urea water 17 or/and the like into the tank 14 is generated and notified of to the driver or the like (step S17).

Figure 5:
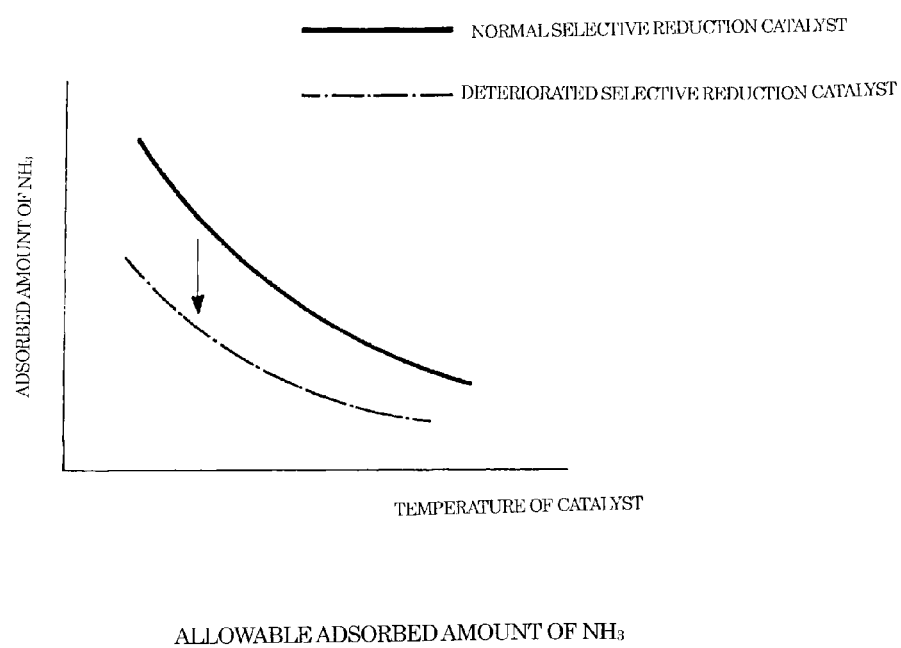
FIG. 5 is a graph of an allowable adsorbed amount of $NH_3$ in the selective reduction catalyst.

When the selective reduction catalyst 10 is deteriorated, an allowable adsorbed amount of $NH_3$ adsorbed by the catalyst 10 is lowered as shown in FIG. 5 so that the $NH_3$ slip is generated. In contrast, when the selective reduction catalyst 10 is normal, the allowable adsorbed amount of $NH_3$ adsorbed by the catalyst 10 is maintained and no $NH_3$ slip is generated.

Thus, according to the first embodiment, mistaken replenishment of the dilute urea water 17 or/and a material such as water other than the urea water into the urea water tank 14 cause a lowering of the $NO_x$ removal rate and do not cause the $NH_3$ slip to the same degree as that of the deteriorated catalyst, so that it is determined that the dilute urea water 17 or/and the material such as water other than the urea water are mistakenly replenished into the tank 14 and the mistaken replenishment can be notified of to the driver or the like; the deteriorated selective reduction catalyst 10 causes the lowering of the $NO_x$ removal rate and generation of the $NH_3$ slip, so that it is determined that the selective reduction catalyst 10 is deteriorated and the deterioration can be notified of to the driver or the like.

Using the lowered $NO_x$ removal rate and the $NH_3$ slip as the determination criteria, the case where the dilute urea water 17 or/and the material such as water other than the urea water are mistakenly replenished is clearly distinguished from the case where the selective reduction catalyst 10 is deteriorated, so that the case of the mistaken replenishment into the tank 14 can be easily and properly detected.

In other existing methods where only the lowering of the $NO_x$ removal rate within a predetermined time period is employed as a determination criterion, it may not be able to detect mistaken replenishment of the dilute urea water 17 or/and the material such as water other than the urea water especially when the urea water 17 in the tank 14 is gradually diluted, for example, in conditions where the dilute urea water 17 or/and the material such as water other than the urea water are mistakenly replenished gradually into the tank 14. In contrast, according to the first embodiment where the lowering of the $NO_x$ removal rate and the $NH_3$ slip are employed as the determination criteria, it can be easily detected that the dilute urea water 17 or/and the material such as water other than the urea water are mistakenly replenished into the tank 14 even when the urea water 17 in the tank 14 is gradually diluted.

According to the first embodiment, mistaken replenishment of the dilute urea water 17 or/and the material such as water other than the urea water into the tank 14 can be easily and properly detected since the $NH_3$ slip can be easily and properly determined by recording the $NH_3$ slip in the driving history and determining the presence or absence of the $NH_3$ slip in the driving history. Therefore, the case where the dilute urea water 17 or/and the material such as water other than the urea water are mistakenly replenished into the tank 14 can be easily and properly detected.

A second embodiment of the invention will be described with reference to drawings.

Figure 3:
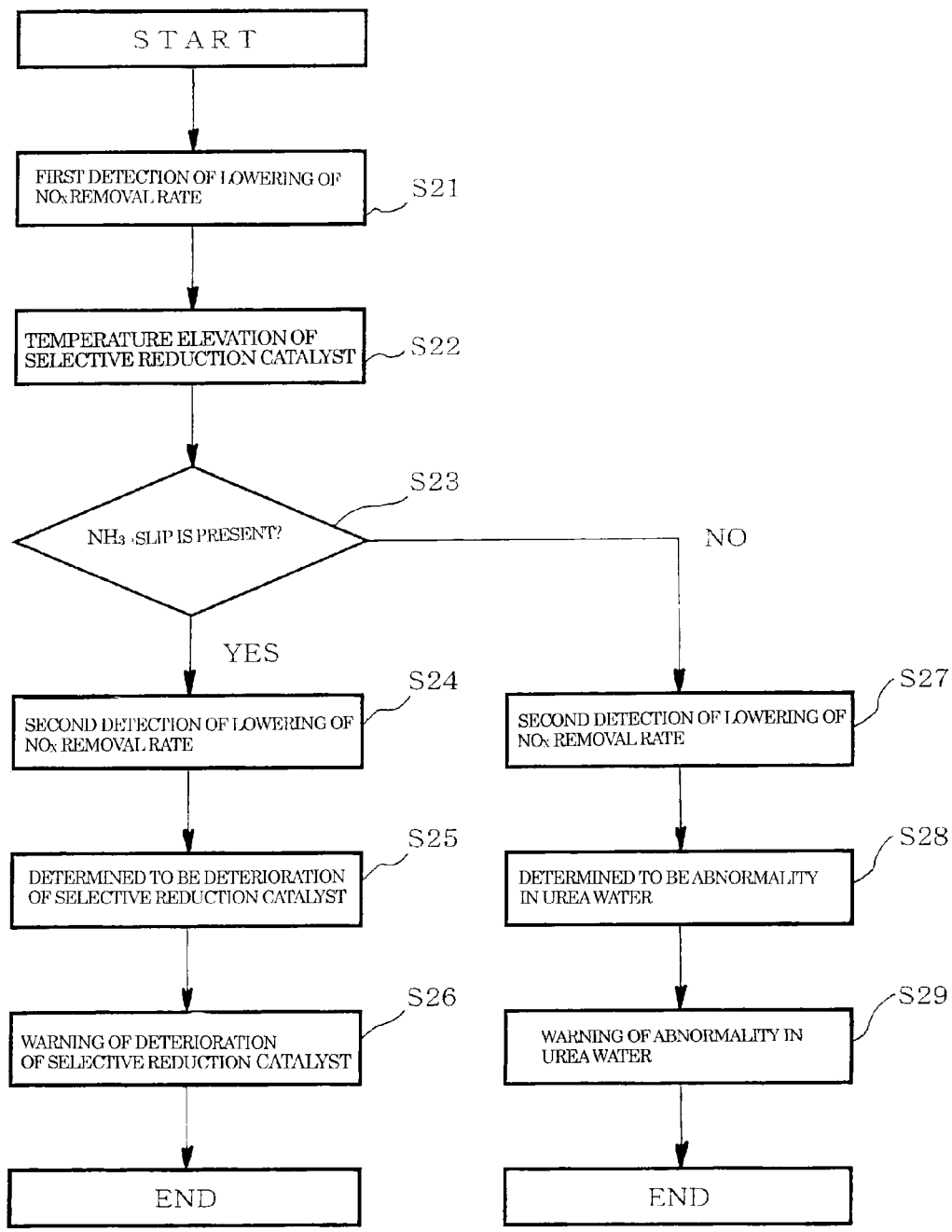
FIG. 3 is a flowchart of processes in a second embodiment of the invention.

FIGS. 1, 3 and 4 are directed to the second embodiment of the invention and show an exhaust emission control device and a method for detecting abnormality in a reducing agent. The general configuration thereof is same as that of the first embodiment and the controller 21 preliminarily has a built-in function to execute processes based on a flow of FIG. 3.

An operation of the second embodiment of the invention will be described.

In order to decrease the concentration of NO discharged in the exhaust gas 7 by the exhaust emission control device, similarly to the first embodiment, from the urea water tank 14, the urea water (reducing agent) 17 is added upstream of the selective reduction catalyst 10 to bring about a reducing reaction of the urea water 17 with NO in the exhaust gas on the catalyst 10 to thereby decrease the concentration of $NO_x$ discharged. Thereafter, the decrease of the urea water 17 in the tank 14 due to the addition of the urea water 17 from the tank is properly compensated by replenishment of the urea water 17 into the tank 14.

In order to distinguish a case of mistaken replenishment of the dilute urea water 17 or/and water (a material other than the urea water) into the tank 14 from a case of the deteriorated selective reduction catalyst 10, the lowering of the $NO_x$ removal rate is detected on the basis of the detection signals 22a and 23a and 24a and 25a (step S21). As to detection of the lowering of the $NO_x$ removal rate in this step, comparison is made with a reference $NO_x$ removal rate (threshold value) recorded in advance. When the $NO_x$ removal rate is lower than the reference $NO_x$ removal rate, it is determined that the lowering of the $NO_x$ removal rate is present and, when the $NO_x$ removal rate is not lower than the reference $NO_x$ removal rate, it is determined that no lowering of the $NO_x$ removal rate is present. When the $NO_x$ removal rate is lower than the reference $NO_x$ removal rate, it is determined that the decrease of the $NO_x$ removal rate is present. When the $NO_x$ removal rate is not lower than the reference $NO_x$ removal rate, it is determined that no decrease of the $NO_x$ removal rate is present. In FIG. 4, the lowering of the NO removal rate is shown as first detection of the lowering.

After detection of the lowering of the $NO_x$ removal rate (step S21), the temperature of the selective reduction catalyst 10 is elevated to a predetermined temperature (step S22) to release any HC (hydrocarbon) which may have been adsorbed by the catalyst 10. In the step, the temperature elevation of the catalyst 10 may be made by, for example, electric means using electric heating, combustion means using flames or the like or addition of fuel. The means is not limited, provided that the selective reduction catalyst 10 can be elevated in temperature. The temperature to be reached and a period for heating are not especially limited, provided that the HC can be released.

After the temperature elevation of the selective reduction catalyst 10, the presence or absence of the $NH_3$ slip is determined depending on whether any $NH_3$ slip is generated (step S23) or not. In the step, the generation of the $NH_3$ slip is determined by determining whether the concentration of $NH_3$ was at or above a specific value. When the concentration was at or above the specific value (threshold value), it is determined and recorded that there was $NH_3$ slip from the selective reduction catalyst 10 to downstream. When the concentration was and is below the specific value (threshold value), it is determined that there was and is no $NH_3$ slip from the catalyst 10 to downstream. In FIG. 4, the detection the $NH_3$ slip is shown as the $NH_3$ slip after the temperature elevation.

When the $NH_3$ slip was present (YES in step S23), a lowering of the $NO_x$ removal rate is detected again on the basis of the detection signals 22$a$ and 23$a$ and 24$a$ and 25$a$ (step S24). In the step, the lowering of the $NO_x$ removal rate is determined using the same process as that of step S21; in FIG. 4, the lowering of the $NO_x$ removal rate is shown as second detection of the lowering. The second detection is a reconfirmation of the lowering of the $NO_x$ removal rate in the state with no HC adsorbed. If the lowering of the $NO_x$ removal rate associated with the deterioration of the selective reduction catalyst 10 can be confirmed only by the first detection, the step of reconfirming the lowering of the $NO_x$ removal rate (step S24) may be unnecessary.

After reconfirming the lowering of the NO removal rate, it is determined that the deterioration of the selective reduction catalyst 10 is present (step S25) and the controller 21 transmits the display signal 27$a$ to the display means 27 where a warning of the deterioration of the selective reduction catalyst 10 is generated and notified of to the driver or the like (step S26).

On the other hand, when no $NH_3$ slip is present (NO in step 23) in determination of presence/absence of the $NH_3$ slip (step S23), the lowering of the $NO_x$ removal rate is similarly reconfirmed on the basis of the detection signals 22$a$ and 23$a$ and 24$a$ and 25$a$ (step S27). In the step, the lowering of the $NO_x$ removal rate is determined using the same process as that of step S21; in FIG. 4, the lowering of the $NO_x$ removal rate is shown as second detection of the lowering. The second detection is a reconfirmation of the lowering of the $NO_x$ removal rate in the state with no HC adsorbed. If the lowering of the $NO_x$ removal rate associated with the deterioration of the selective reduction catalyst 10 can be confirmed only by the first detection, the step of reconfirming the lowering of the $NO_x$ removal rate (step S27) may be unnecessary.

After reconfirming the lowering of the $NO_x$ removal rate, it is determined that the urea water 17 has abnormality and that the dilute urea water 17 or/and a material such as water other than the urea water are mistakenly replenished into the tank 14 (step S28). In the step, the dilute urea water 17 is not limited to that with a specific concentration, provided that the concentration of the usual urea water 17 in the tank 14 can be lowered; and the kind of material other than the urea water is not especially limited, provided that the concentration of the urea water 17 in the tank 14 can be lowered.

The controller 21 transmits the display signal 26$a$ to the display means 26 where a warning of mistaken replenishment of the dilute urea water 17 or/and the like into the tank 14 is generated and notified of to the driver or the like (step S29).

Thus, according to the second embodiment, the same actions and effects can be acquired as those of the first embodiment.

According to the second embodiment, when the $NO_x$ removal rate is lowered, the temperature of the selective reduction catalyst 10 is elevated and thereafter the presence or absence of the $NH_3$ slip is determined in the state where any HC adsorbed by the selective reduction catalyst 10 is released, so that the lowering of the removal rate and the $NH_3$ slip can be accurately and securely grasped. Thus, the case where the dilute urea water 17 or/and the material such as water other than the urea water are mistakenly replenished can be easily and properly distinguished from the case where the selective reduction catalyst 10 is deteriorated, and the case where the dilute urea water 17 or/and the material such as water other than the urea water are mistakenly replenished into the tank 14 can be easily and properly detected.

Furthermore, according to the second embodiment, when the second decrease of the $NO_x$ removal rate is further detected after determining the presence/absence of the $NH_3$ slip, the lowering of the $NO_x$ removal rate can be reconfirmed or can be confirmed in the state where no HC is adsorbed. Thus, the case where the dilute urea water 17 or/and the material such as water other than the urea water are mistakenly replenished into the tank 14 can be easily and properly detected.

It is to be understood that a method for detecting abnormality in a reducing agent according to the invention is not limited to the above embodiments and that various changes and modifications may be made without departing from the scope of the invention. For example, light oil or the like other than the urea water may be used as the reducing agent added to the selective reducing catalyst.

REFERENCE SIGNS LIST 9 exhaust pipe
10 selective reduction catalyst
14 urea water tank
17 urea water (reducing agent)

The invention claimed is:

1. A method for detecting abnormality in a reducing agent replenished to a reducing agent tank in an exhaust emission control device for reduction and removal of $NO_x$ through addition of the reducing agent from said tank to a selective reduction catalyst incorporated in an exhaust pipe, which comprises:
    detecting whether $NO_x$ removal rate is lowered;
    elevating a temperature of the selective reduction catalyst after the detecting step to release any hydrocarbon which may have been absorbed by the selective reduction catalyst to obtain a state where no hydrocarbon adsorbed by the selective reduction catalyst remains;
    recording presence or absence of $NH_3$ slip in a driving history after the elevating step;
    conducting a second detection of whether the $NO_x$ removal rate is lowered after the recording step and confirming the state where no hydrocarbon adsorbed remains;
    determining a deterioration of the selective reduction catalyst when the presence of the $NH_3$ slip is determinable by the driving history; and
    determining that a dilute reducing agent or a material other than the reducing agent are replenished into the tank when the absence of the $NH_3$ slip is determinable by the driving history.

2. A method for detecting abnormality in a reducing agent replenished to a reducing agent tank in an exhaust emission control device for reduction and removal of $NO_x$ through addition of the reducing agent from said tank to a selective reduction catalyst incorporated in an exhaust pipe, which comprises:

detecting whether $NO_x$ removal rate is lowered;

elevating a temperature of the selective reduction catalyst after the detecting step to release any hydrocarbon which may have been absorbed by the selective reduction catalyst to obtain a state where no hydrocarbon adsorbed by the selective reduction catalyst remains;

recording presence or absence of $NH_3$ slip in a driving history after the elevating step;

conducting a second detection of whether the $NO_x$ removal rate is lowered after the recording step and confirming the state where no hydrocarbon adsorbed remains;

determining a deterioration of the selective reduction catalyst when the presence of the $NH_3$ slip is determinable by the driving history; and determining that a dilute reducing agent and a material other than the reducing agent are replenished into the tank when the absence of the $NH_3$ slip is determinable by the driving history.

* * * * *